United States Patent
Liu et al.

(10) Patent No.: US 12,125,119 B1
(45) Date of Patent: Oct. 22, 2024

(54) CROSS-MODAL IMAGE-WATERMARK JOINT GENERATION AND DETECTION DEVICE AND METHOD THEREOF

(71) Applicant: TIANJIN UNIVERSITY, Tianjin (CN)

(72) Inventors: Anan Liu, Tianjin (CN); Guokai Zhang, Tianjin (CN); Lanjun Wang, Tianjin (CN); Ning Xu, Tianjin (CN); Yuting Su, Tianjin (CN); Yongdong Zhang, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/533,383

(22) Filed: Dec. 8, 2023

(30) Foreign Application Priority Data

Aug. 28, 2023 (CN) .......................... 202311085662.9

(51) Int. Cl.
*G06K 9/00* (2022.01)
*G06T 1/00* (2006.01)
(Continued)

(52) U.S. Cl.
CPC .......... *G06T 1/0028* (2013.01); *G06T 1/0064* (2013.01); *G06T 1/0078* (2013.01);
(Continued)

(58) Field of Classification Search
CPC ... G06T 1/0028; G06T 1/0064; G06T 1/0078; G06T 7/0002; G06T 11/00;
(Continued)

(56) References Cited

U.S. PATENT DOCUMENTS 6,205,249 B1 * 3/2001 Moskowitz ............... H04L 9/14
380/54
7,058,979 B1 6/2006 Baudry et al.
(Continued)

FOREIGN PATENT DOCUMENTS

CN 102117474 B * 5/2013 ............... G06T 1/00
CN 113158583 A 7/2021
(Continued)

OTHER PUBLICATIONS

Zhenwan, Zou et al., GAN Based Image Watermarking Steganography Method Without Carrier, in Research on Information Security, Jan. 5, 2022, p. 2-8.
(Continued)

*Primary Examiner* — Shervin K Nakhjavan (57) ABSTRACT

The present disclosure discloses a cross-modal image-watermark joint generation and detection device and method thereof. The device includes a multimodal encoder, an image-watermark feature co-embedding module, an image-watermark feature fusion module, an up-sampling generator, a non-cooperative game decoupling module configured to decouple an unwatermarked image and a reconstructed watermark from a composite image through two decoders by developing allocation strategies according to a non-cooperative game theory and a Shannon information theory; a strategy allocation module configured to set an composite image discriminator, keeping the consistency between the composite image and input text by multi-specification downsampling convolution kernels and set the objective functions to constrain watermark reconstruction and unwatermarked image decoding; and a post-processing attack module configured to simulate various attacks for ensuring the robustness of watermarks.

7 Claims, 5 Drawing Sheets

(51) Int. Cl.
*G06T 7/00* (2017.01)
*G06T 11/00* (2006.01)

(52) U.S. Cl.
CPC ............ *G06T 7/0002* (2013.01); *G06T 11/00* (2013.01); *G06T 2207/20016* (2013.01); *G06T 2207/20081* (2013.01); *G06T 2207/20084* (2013.01)

(58) Field of Classification Search
CPC . G06T 2207/20016; G06T 2207/20081; G06T 2207/20084
See application file for complete search history.

(56) References Cited

U.S. PATENT DOCUMENTS

| | | | |
|---|---|---|---|
| 2010/0250497 A1* | 9/2010 | Redlich | G06Q 10/06 707/661 |
| 2019/0236747 A1 | 8/2019 | Zhong et al. | |
| 2024/0087075 A1* | 3/2024 | Luo | G06T 1/0064 |

FOREIGN PATENT DOCUMENTS

| | | |
|---|---|---|
| CN | 113222800 A | 8/2021 |
| CN | 116029887 A | 4/2023 |
| WO | 2023136805 A1 | 7/2023 |

OTHER PUBLICATIONS

H. Wu et al., Watermarking neural networks with watermarked images, in Video Technol, Dec. 31, 2021, p. 2591-2601.
W. Wan et al., A comprehensive survey on robust image watermarking, in Neurocomputing, vol. 488, Jun. 1, 2022, p. 226-247.

* cited by examiner

CROSS-MODAL IMAGE-WATERMARK JOINT GENERATION AND DETECTION DEVICE AND METHOD THEREOF

CROSS-REFERENCE TO RELATED APPLICATION

This application claims priority from the Chinese patent application 202311085662.9 filed Aug. 28, 2023, the content of which is incorporated herein in the entirety by reference.

TECHNICAL FIELD

The present disclosure relates to the field of visually generated content security, in particular to a cross-modal image-watermark joint generation and detection device and method thereof.

BACKGROUND ART

A large number of artificial intelligence generated content (AIGC) platforms are emerging due to the growing demand for personalization and customization in design fields such as art and advertising. Users can draw paintings that rival professional photography and master masterpieces benefiting from existing text-to-image (T2I) generation models. The degree of fidelity of synthetic images has exceeded the human ability to recognize their authenticity. In order to ensure the security and reliability of the generated content, safe, reliable and valuable artificial intelligence technologies are developed by integrating invisible but recognizable watermarks into generated images of future products. In addition, it can be expected that more reasonable supervisory measures will be proposed successively to ensure the security of a text-to-image generation technology.

Under the background of the current proliferation of generated images, a novel technical means combining text-to-image and watermark embedding is urgently needed, that is, watermarks carrying creation-related metadata are hidden in the generated images. After the images are disseminated, watermark signals can be extracted therefrom to track sources and authenticity of the images, so as to alleviate the security problems such as the spread of false information and increase the credibility and reliability of the generated content.

Although some progress has been made in current text-to-image generation and digital watermarks, current application requirements are difficult to meet. As a representative field of visual content generation, the text-to-image generation aims to describe visual elements based on text characters to generate high-quality realistic images. A current method based on a generative adversarial network (GAN) has demonstrated high generative capability in text-to-image tasks, which consists of a generator for synthetic images and a discriminator for evaluating the authenticity of the images, so as to ensure that synthetic image distribution fits real data distribution. It has the advantages of low training cost, high expandability and high reasoning speed, and can be applied to a variety of computility platforms. However, text-to-image generation still hardly fills in the cross-modal challenge from words to pixels, and the traceability of the generated images cannot be realized. The digital watermark technology aims to embed the digital watermarks into the images to ensure the invisibility of the watermarks under the condition of reducing the disturbance to the images, however, the problems that embedding of diversified information cannot be achieved, and that the robustness against post-processing attacks is poor still exist. At present, text-to-image generation has a broad market prospect. In order to ensure security and reliability, it is necessary to design a watermark embedding paradigm adapting to text-to-image characteristics to overcome the above defects.

Considering the above existing technical problems, it is necessary to jointly generate images and watermarks from texts, leading to more severe challenges, however, no technical solution is available at present. The basic paradigm thereof is that the creation-related metadata is mapped into the digital watermarks hidden in the generated images, and the watermarks can be reconstructed at a receiving end to achieve the traceability of the generated images, privacy protection, and other security-related purposes. Therefore, a text-conditioned image and watermark joint generation system needs to consider the following factors: pixels of the composite images should have both text semantics and watermark signals, which are compatible with each other to ensure high quality of the images; the invisibility of the watermark is ensured while the generated images have a good visual effect; and, the hidden watermarks can still be fully reconstructed from the composite images even in response to various post-processing attacks to ensure the robustness of the watermarks. The system is also expected to hide and reconstruct the digital watermarks with diversified data, and ensure the adaptability to the diversified watermark signals. The reliability and security of the generated images are ensured through the hidden embedding and lossless reconstruction of the digital watermarks, so as to achieve the effective supervision of the visually generated content.

To sum up, as the supplement to the text-to-image technology, there are two main technical requirements for cross-modal image-watermark joint generation and detection:

(1) Currently, a large number of generative artificial intelligence platforms have emerged, and the authenticity of the synthetic images exceeds the human recognition ability. Due to the low threshold of creation, common users can perform creation according to various target input texts, resulting in a proliferation of diversified generated content, and a large amount of harmful or fake information is mixed therein. However, a supervisory technical means for text-to-image generation is not available currently, which makes it difficult to trace sources of trace harmful images. Based on this application requirement, it is urgent to promote the development of text-to-image generation towards a more secure and reliable generation paradigm.

(2) In addition, although some research progress has been made in the text-to-image generation and digital watermarks, it is difficult to meet current traceability application requirements. The text-to-image technology has the problems that the cross-modal heterogeneous gap from words to pixels is hardly filled in, and the traceability of the generated images cannot be achieved. Moreover, the traditional digital watermark technology has the problem of inability to achieve embedding of diversified information and low robustness against post-processing attacks. Therefore, the cross-modal image-watermark joint generation technology is under great challenges, and it is urgent to achieve the end-to-end watermark and image joint generation.

To sum up, no attention or exploration has been paid to image and watermark joint generation from text yet currently. The technology needs to take image quality, watermark invisibility, watermark robustness and diversity of watermarks into account.

SUMMARY

The present disclosure provides a cross-modal image-watermark joint generation and detection device and method thereof. According to the present disclosure, a digital watermark signal is embedded and integrated into a text-to-image generation process to acquire an composite image with an invisible watermark, and the watermark can still be reconstructed with high quality after being subjected to external post-processing attacks. This technology aims to achieve the purposes of traceability for generated images, such that the effective supervision of visual generative artificial intelligence is achieved, and the reliability and security of generation technologies are guaranteed. The detailed description is given as follows:

In the first part, a cross-modal image-watermark joint generation and detection device is provided, and the device includes:

- an image-watermark feature co-embedding module, configured to map an original image feature and a watermark feature to a unified feature space by a learnable parameter matrix;
- an image-watermark feature fusion module, configured to fuse the watermark feature and the original image feature at a channel level to acquire an image-watermark fusion feature and cascade the original image feature for a plurality of times;
- an up-sampling generator, configured to map the image-watermark fusion feature into pixels to acquire a composite image with a preset resolution;
- a non-cooperative game decoupling module, configured to allocate information of the composite image through two decoders by developing allocation strategies according to a non-cooperative game theory and a Shannon information theory to decouple an unwatermarked image and a reconstructed watermark;
- a strategy allocation module, configured to set objective functions of the composite image, the original image and a digital watermark, namely set an image discriminator to extract features of the composite image by multi-specification down-sampling convolution kernels to constrain image-text semantic consistency and fidelity, and meanwhile set an objective function to constrain reconstruction of watermark and unwatermarked image; and
- a post-processing attack module, configured to simulate post-processing attacks and output a final attacked composite image.

In the second part, a cross-modal image-watermark joint generation and detection method is provided, and the method includes:

- achieving a feature compatibility of an image and a watermark by an image-watermark feature co-embedding matrix; fusing features of the watermark and the image by image-watermark feature fusion at a channel level;
- synthesizing a high-resolution composite image with an invisible watermark by an up-sampling generator; decoupling an unwatermarked image and a reconstructed watermark based on a non-cooperative game theory;
- constraining the composite image, the unwatermarked image and the reconstructed watermark by strategy allocation; attacking the composite image by post-processing attacks; and judging embedding and analysis effects of the image and the watermark.

In the third part, a cross-modal image-watermark joint generation and detection device is provided, and the device includes a processor and a memory, wherein program instructions are stored in the memory, and the processor calls the program instructions stored in the memory to enable the device to implement the method in the second part.

In the fourth part, a computer-readable storage medium is provided, and a computer program is stored on the computer-readable storage medium; the computer programs include program instructions; and when the program instructions are executed by the processor, the method in the second part is implemented by the processor.

The technical solution provided by the present disclosure has the following beneficial effects:

(1) in order to solve the problem that the current generated image is hard to trace and supervise in terms of security, the present disclosure provides a novel technical means combining text-to-image generation and digital watermark embedding, and achieves traceability, privacy protection and other security purposes by integrating the digital watermark with diversified metadata into the generated image; the framework provided by the present disclosure is easy to popularize to text-to-image models based on the generative adversarial network to achieve hiding and approximately lossless reconstruction of watermark signals; the solution has good generalization;

(2) the present disclosure provides a joint framework that integrates text-to-image generation and watermark embedding; the watermark signal can be embedded into the image feature by the image-watermark feature fusion module under the condition of not affecting image generation quality, and the purpose of hiding the watermark signals is achieved objectively; the joint framework is a watermark coding mode with high invisibility;

(3) the present disclosure provides a method for decoupling the watermark and the image from the composite image according to the Shannon information theory and the non-cooperative game theory, and the trade-off between the quality of the image and the invisibility of the watermark is achieved; the approximately lossless watermark reconstruction is realized;

(4) in the present disclosure, post-processing attacks are simulated in training to obtain robust encoder-decoder parameters, and a high-quality watermark can still be reconstructed under common attacks with different intensities to achieve the strong robustness;

(5) the present disclosure provides an evaluation system for a joint text-to-image and digital watermark technology to comprehensively evaluate the image quality, watermark invisibility, watermark reconstruction quality, watermark robustness and the like.

BRIEF DESCRIPTION OF THE DRAWINGS

Wherein, in FIG. 2, 11 represents Image-watermark feature co-embedding module.

DETAILED DESCRIPTION OF THE PRESENT DISCLOSURE

To make the objectives, technical solutions and advantages of the present disclosure clearer, the implementations of the present disclosure will be further described below in detail.

Embodiment 1

Figure 1:
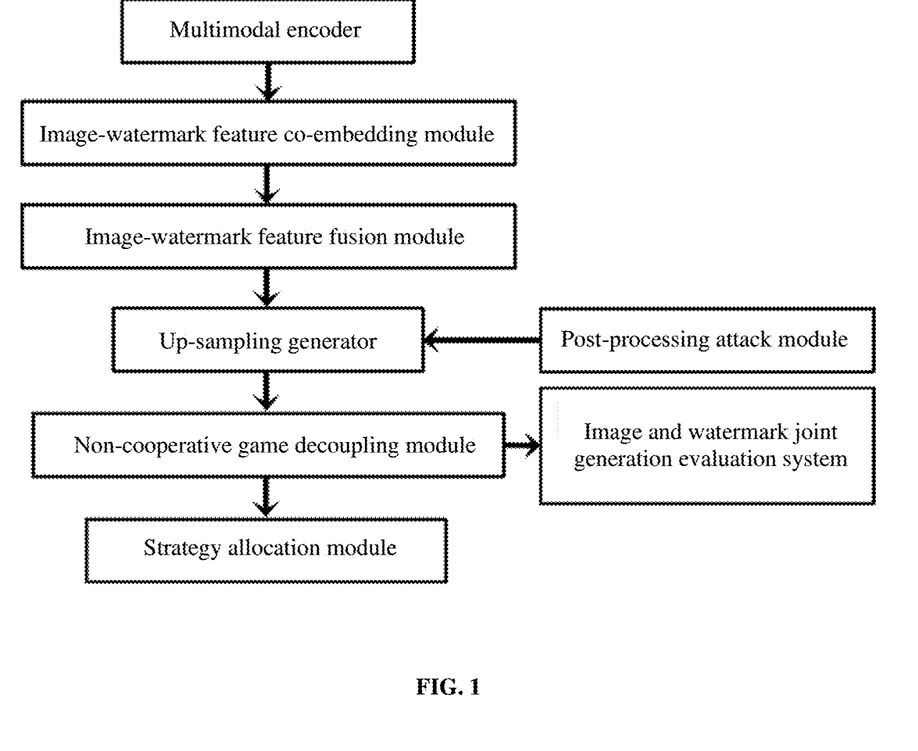
FIG. 1 is a frame diagram of a cross-modal image-watermark joint generation and detection device.
Figure 2:
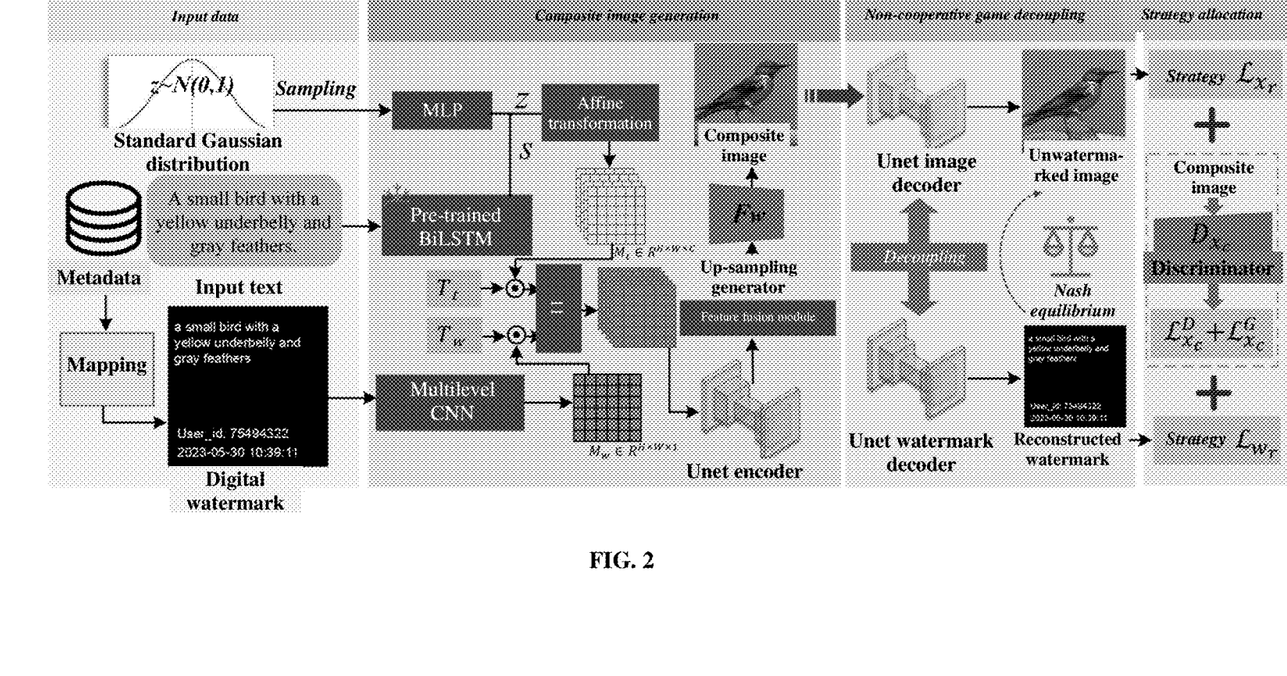
FIG. 2 is a schematic diagram of a network framework of a cross-modal image-watermark joint generation and detection device.

A cross-modal image-watermark joint generation and detection device, referring to FIG. 1 and FIG. 2, the device includes:

I. A multimodal encoder, configured to extract features from an input text, noise sampling and a digital watermark by pre-trained natural language encoding models, multilayer perceptrons, and visual encoding models, and acquire feature representations thereof to obtain an original image feature through affine transformation using text features and noise features.

Specifically, the multimodal encoder further includes:

1) a BiLSTM (bidirectional long short-term memory) context-aware encoding unit, configured to sequentially encode word embedding features by pre-trained long short-term memory networks, such that the text features have context-aware information, and the sentence-level embedding representation is obtained.

The text features are sequentially fed into BiLSTM for bidirectional coding, and a hidden state $s \in \mathbb{R}^{L_1 \times 1}$ of a whole sentence is acquired as a context-aware feature, wherein $L_1$ represents a sentence vector length.

2) A multilayer perceptron noise coding unit, configured to map noise obtained by random sampling in a standard Gaussian distribution into a feature vector by multilayer perceptron networks to increase the variety of generated images.

The noise obtained by random sampling in the standard Gaussian distribution N(0,1) is fed into an MLP network and mapped into the feature vector $z \in \mathbb{R}^{L_2 \times 1}$, wherein $L_2$ represents a noise vector length.

3) A watermark generation unit, configured to map creation-related metadata into a single-channel binary watermark embedded into an image in a hidden manner, by which the purpose of traceability is achieved.

Specifically, text, creative time, creator ID and other factors are entered into single-channel binary watermark pixels in a character form, wherein the creator ID is set to be 8 digits, with each digit being sampled from uniform distribution U(0,9).

4) A multilayer convolutional network watermark feature extraction unit, configured to extract binary watermark features by convolutional neural networks to obtain spatial-level feature representation.

Wherein, the single-channel binary watermark is fed into multilayer convolutional neural networks (CNN) to obtain the watermark features $M_w \in \mathbb{R}^{H \times W \times 1}$. 4 layers of the multilayer convolutional neural networks are set, and numbers of output channels are set to 3, 6, 12 and 1 respectively; LeakyReLu activation functions are set among the layers, dimensions of a receptive field are set to 3×3, and a convolution step size is set to 1.

5) An image feature initialization unit, configured to generate image initial features by calculation through affine transformation based on noise sampling and text input.

In order to enrich the visual effect of the generated image, affine transformation is introduced to fuse noise and text features, and a specific implementation process thereof may be expressed as:

$$\text{Affine}(z,s) = \gamma_{scale}(s) \cdot \eta(z) + \gamma_{shift}(s) \quad (1)$$

Where, Affine(·) represents an affine transformation function, $\gamma_{scale}(\cdot)$, $\gamma_{shift}(\cdot)$ and $\eta(\cdot)$ represent translation, scaling and noise mapping functions. An output matrix of the affine transformation is expressed as $M_t \in \mathbb{R}^{H \times W \times C}$, which is regarded as an original image feature, wherein H, W, C represent a height and a width, and channels of a feature matrix respectively, and $\mathbb{R}$ represents a feature space.

II. An image-watermark feature co-embedding module, configured to map an original image feature and a watermark feature to a unified feature space by a learnable parameter matrix to achieve the compatibility of the original image feature and the watermark feature.

Specifically, in order to improve the representation ability of the image and optimize the invisibility of the watermark, it is necessary to find a feature co-embedding space for integrating the original image feature $M_t$ and the watermark feature $M_w$. Learnable corresponding dimension parameter matrices $T_t$ and $T_w$ are initialized randomly, and the watermark feature and the image feature are enabled to be compatible in a training process, and a specific implementation process thereof is expressed as:

$$f_{t,w} = \phi_c(T_t M_t, T_w M_w) \quad (2)$$

Where, $f_{t,w}$ represents an image and watermark splicing feature, and $\phi_c(\cdot)$ represents a channel-level splicing operation, which aims to express the watermark and the image in the same feature space.

III. an image-watermark feature fusion module, configured to fuse the watermark feature and the original image feature at a channel level to achieve the effects of hiding watermark signals and highlighting a high-quality image visual effect by cascading the original image feature for many times.

Specifically, the splicing feature $f_{t,w}$ is compressed by a Unet network to obtain low-level key information, and correlation mining is conducted on different scale features by skip connection to learn multi-scale watermark and image information. Furthermore, in order to reduce watermark interference to the image feature, the original image feature $M_t$ is fused for many times, and a watermark signal ratio is reduced. The specific implementation process may be expressed as:

$$M_i^c = \begin{cases} E_{Unet}(f_{t,w}), & i = 1 \\ Y_i(M_{i-1}^c, M_t; \theta_i), & i = 2, 3, \ldots, N \end{cases} \quad (3)$$

Where, $Y_i(\cdot)$ is an ith-layer feature fusion module, which mainly consists of a full connected network (FCN) with a parameter of $\theta_i$ and a nearest neighbor interpolation algorithm. In the embodiment of the present disclosure, the number of layers is set to 3. $M_i^c$ is a composite visual feature map output from an ith layer. $E_{Unet}(\cdot)$ is a Unet-based encoder configured to couple the visual feature to the watermark feature. In the embodiment of the present disclosure, even in the case that the watermark interference to the image quality is minor, the watermark information can also be protected from being lost.

IV. An up-sampling generator, configured to map watermark image fusion features into pixels, semantic information and watermark signals are included therein, and finally a composite image with a resolution of 256×256 is obtained.

In order to generate the composite image with a hidden watermark by using the fusion feature $M_i^c$, it is processed by the up-sampling generator, and the specific implementation process may be expressed as:

$$x_c = F_w(M_i^c; \theta_c) \quad (4)$$

Where, $F_w(\cdot)$ represents an up-sampling generation function of a parameter $\theta_c$. $x_c$ is the composite image with a resolution of 256×256, which shows an excellent visual effect and fully hides the watermark information.

V. A non-cooperative game decoupling module, configured to allocate information of the composite image through two decoders by developing allocation strategies according to a non-cooperative game theory and a Shannon information theory to decouple an unwatermarked image and a reconstructed watermark.

Specifically, a non-cooperative game features that there is a lack of communication and negotiation among game participants who need to develop their own dominant strategies. Concretely speaking, the participants place a strong emphasis on independent decision making to maximize their own interests, the decision making is independent of strategies adopted by other participants in strategic environment, and the ultimate objective is to achieve balance among game players.

For the game $G=(s_1, s_2, \ldots, s_n; p, p_2, \ldots, p_n)$, supposing that $(s_1', s_2', \ldots, s_n')$ is an arbitrary strategy combination, when meeting the strategy $(s_1', \ldots, s_{i-1}', s_{i+1}', \ldots, s_n')$ of other participants, the strategy $s_i^*$ is the optimum selection of the participant $p_i$. The non-cooperative game is formulated as:

$$\sigma^* = (s_1^*, s_2^*, \ldots, s_n^*) = \underset{(s_1, s_2, \ldots, s_n)}{\operatorname{argmax}} M_{gain}^P(s_1, s_2, \ldots, s_n) \quad (5)$$

$$M_{gain}^{p_i}(s_1', \ldots, s_i^*, \ldots, s_n') \geq M_{gain}^{p_i}(s_1', \ldots, s_i', \ldots, s_n'), \forall i \quad (6)$$

Where, $\sigma^*$ represents a set of Nash equilibrium strategies, that is, no participants may increase gains by changing their own strategies alone. $M_{gain}^{P_i}(\cdot)$ represents the gain of the gain participant from the execution of the set of strategies, P represents a set of participants, $M_{gain}^P(\cdot)$ represents a set of gains of all participants from the execution of the set of strategies, $s_n$ represents the strategy of the nth participant, $s_n'$ represents any strategy of the nth participant, and $p_n$ represents the n-th participant. In the image and watermark joint generation, decoupling of the image and the watermark may be regarded as a non-cooperative game process. While the image feature and the watermark feature have contributions to the overall visual effect of the composite image to varying degrees, supposing that there are contribution factors $c_{x_r}$, $c_{w_r}$, and $c_{x_c}$, which reflect contribution degrees of $x_r$, $w_r$ and $x_c$ respectively, and they are approximate to an allocation strategy with linear positive correlation:

$$c_{x_c} \propto (1-\sigma(x_c)) \cdot c_{x_r} + \sigma(x_c) \cdot c_{w_r} \quad (7)$$

Where, $\sigma(\cdot)$ reflects allocation strategies of two contributors, the value range is [0,1], and $\propto$ represents a positive correlation. Theoretically, the watermark and the image participate in a non-cooperative game, and strive to achieve a Nash equilibrium state. Supposing that $c_{x_c}$ reaches an optimal point $c_{x_c}^*$, it has an optimal visual representation effect.

$$\sigma^*(c_{x_c}) \propto \frac{c_{x_c}^* - c_{x_r}}{c_{w_r} - c_{x_r}} \quad (8)$$

Where, $\sigma^*(\cdot)$ represents an optimal allocation strategy. Formula (8) is simplified:

$$\frac{1}{\sigma^*(c_{x_c})} \propto C^* - \frac{c_{x_c}^* - c_{w_r}}{c_{x_c}^* - c_{x_r}} \quad (9)$$

Where, C* is a constant. The allocation strategies are dependent on $c_{w_r}$ and $c_{x_r}$, that is, the strategies are developed by the watermark and the image respectively. Therefore, the Nash equilibrium state $(x_r^*, w_r^*)$ may be calculated according to Formula (1):

$$\sigma^*(x_c) = \underset{(s_{x_r}, s_{w_r})}{\operatorname{argmax}} M_{gain}^P(s_{x_r}, s_{w_r}) = \lim_{\theta_x \to \theta_x^*, \theta_w \to \theta_w^*} \sigma(x_r, w_r; \theta_x, \theta_w) \quad (10)$$

Where, $s_{x_r}$ and $s_{w_r}$ are the strategies for decoding the image and reconstructing the watermark, $\theta_x$ and $\theta_w$ are corresponding network parameters, and $\theta_x^*$ and $\theta_w^*$ are optimal parameters. $(x_r, w_r)$ are closer to $(x_r^*, w_r^*)$, and then the Nash equilibrium is more approximately achieved. Ideally, $s_{x_r}$ and $s_{w_r}$ achieve the trade-off under the condition of no mutual interference, and decoupling is completed.

Specifically, the non-cooperative game decoupling module further includes:

1) an image decoding unit, configured to decouple the unwatermarked image from the composite image.

The embodiment of the present disclosure designs a cooperative decoupling method for a watermark and an image. Ideally, an unwatermarked image is expected to retain visual information equivalent to that of the composite image, to reduce the disparity therebetween. Furthermore, watermark signals should not be stored in the unwatermarked image. According to the Shannon information theory, this process aims to reduce the difference between the unwatermarked image and the composite image, and meanwhile expand a gap between the image with hidden watermark and the unwatermarked image. The specific implementation process of this strategy may be expressed as:

$$\underset{s_{x_r}}{\operatorname{argmax}} M_{gain}^{P_{x_r}}(s_{x_r}) \quad (11)$$

$$= \underset{\theta_x}{\operatorname{argmin}} L_{x_c \to x_r}(\theta_x)$$

$$= \underset{\theta_x}{\operatorname{argmin}} [\Delta MI(w_h, x_r; \theta_x) - \Delta MI(x_c, x_r; \theta_x)]$$

$$\text{s.t., } \Delta MI(x_c, x_r) \leq I(x_c) - I(w_r)$$

Where, $\Delta MI(\cdot)$ represents a mutual information function calculated by Kullback-Leibler divergence and used for optimizing a parameter $\theta_x$, $s_{x_r}$ represents an unwatermarked image decoupling strategy, $M_{gain}^{P_{x_r}}(\cdot)$ represents a gain from the execution of the unwatermarked image decoupling strategy, $I(x_c)$ represents an information quantity of $x_c$, $I(w_r)$ represents an information quantity of $w_r$, $w_h$ represents a hidden watermark. A target $L_{x_c \to x_r}(\theta_x)$ aims to restore the unwatermarked image $x_r$.

In order to achieve the Formula (11), the composite image is firstly processed by the decoder, and the specific implementation process may be expressed as:

$$x_r = R_r(x_c; \theta x) \quad (12)$$

Where, $R_r(\cdot)$ is a Unet-based image decoder, configured to establish a pixel-level dependency between the composite image and an analytic image.

2) A watermark reconstruction unit, configured to reconstruct an approximately lossless high-quality watermark from the composite image.

Specifically, the unwatermarked image $x_r$ is almost dependent of information of the reconstructed watermark $w_r$ ideally, while the composite image $x_c$ and the reconstructed watermark $w_r$ share hidden information. Thus, in the feature space, the self-information of the composite image is set to $I(x_c)$, and the mutual information thereof to the unwatermarked image is set to $\Delta MI(x_c, x_r)$, while $I(w_r)$ aims to search the feature space of a supplementary set $C_{I(x_c)} \Delta MI(x_c, x_r)$ thereof. The specific implementation process of this strategy may be expressed as:

$$\operatorname*{argmax}_{s_{w_r}} M_{gain}^{P_{w_r}}(s_{x_r}) \quad (13)$$

$$= \operatorname*{argmin}_{\theta_w} L_{x_c \to w_r}(\theta_w)$$

$$= \operatorname*{argmin}_{\theta_w} \{[I(x_c; \theta_w) - \Delta MI(x_c, x_r; \theta_w)] - I(w_r; \theta_w)\}$$

$$\text{s.t., } I(w_r) < I(x_c)$$

Where, $s_{w_r}$ represents a watermark reconstruction strategy, and $M_{gain}^{P_{w_r}}(\cdot)$ represents a gain from the execution of the watermark reconstruction strategy. The target $L_{x_c \to w_r}(\theta_w)$ compels $w_r$ to keep away from the space $x_r$ and approach to the space $x_c$. Therefore, information hidden in $w_r$ may be restored effectively. Furthermore, similar to the Formula (12), an encoder is required to obtain $w_r$, and the specific implementation process may be expressed as:

$$w_r = R_w(x_c; \theta_w) \quad (14)$$

Where, $R_w(\cdot)$ is a Unet-based watermark decoder, and thus, under the independent strategy and the decoder, the image and the watermark may be cooperatively decoupled while approaching the Nash equilibrium state.

VI. A strategy allocation module, configured to set objective functions of the composite image, the unwatermarked image and reconstructed watermark, namely set an image discriminator, extract features of the composite image by multi-specification down-sampling convolution kernels to constrain image-text semantic consistency and fidelity, and meanwhile set an objective function to constrain the reconstruction of watermark and unwatermarked image.

Specifically, the strategy allocation module further includes:

1) a composite image discrimination strategy, configured to set the discriminator to constrain the composite image.

In the embodiment of the present disclosure, it is not only required to generate the composite image $x_c$, but also the unwatermarked image $x_r$ is decoupled by the specific Unet decoder. Therefore, the discriminator is required to ensure the authenticity of the image. For the composite image, the initialized image feature $M_t$ is used for guiding the semantic expression of $x_c$. The objective function of the composite image discriminator is defined as:

$$L_{x_c}^D = E_{x \sim p_r}[\log(D_{x_c}(x, s))] + \quad (15)$$
$$\frac{1}{2} E_{x_c \sim p_{x_c}}[\log(1 - D_{x_c}(x_c, s))] + \frac{1}{2} E_{x \sim p_r}[\log(1 - D_{x_c}(x, \hat{s}))]$$

Where, $\hat{s}$ corresponds to mismatched text description, x represents a real image, and $p_r$ and $p_{x_c}$ represent real data distribution and composite image distribution. In order to ensure the visual effect of the generated image, the objective function of the composite image discriminator is defined as:

$$L_{x_c}^G = -E_{x_c \sim p_g}[\log(D_{x_c}(x_c, s))] + \lambda_1 \cdot \delta(x_c, M_t) \quad (16)$$

Where, $\delta(\cdot)$ measures similarity between $x_c$ and the initial image feature $M_t$ by using MSE-L2 loss. $\lambda_1$ is a proportional coefficient.

2) An unwatermarked image decoding strategy, configured to split the unwatermarked image from the composite image.

As a supplement of target $L_{x_c \to w_r}$, the present disclosure adopts smooth L1 loss $\|\cdot\|_1$ for further constraining the generation of analysis image:

$$L_{x_c} = L_{x_c \to w_r} + \Delta_2 \cdot \|w_h, w_r\|_1 \quad (17)$$

Where, $\Delta_2$ is a proportional coefficient. The objective function is used for eliminating the watermark while maintaining a similar visual appearance with the composite image by the smooth L/loss.

3) A reconstructed watermark strategy, configured to reconstruct watermark signal from the composite image.

In the embodiment of the present disclosure, a powerful constraint $\delta(\cdot)$ is introduced to ensure the completeness of $w_r$, and the objective function for restoring the watermark is as follows:

$$L_{w_r} = L_{x_c \to w_r} + \Delta_3 \cdot p(w_h, w_r) \quad (18)$$

Where, $\lambda_3$ is a proportional coefficient, and the objective function for keeping the reconstructed watermark consistent with the hidden watermark.

VII. A post-process attack module, configured to simulate post-processing attacks of random cropping, space rotation, Gaussian noise, impulse noise, Gaussian blur, and brightness adjustment, such that the watermark adapts to robustness against common attacks.

In real scenarios where post-processing attacks such as Gaussian noise, space rotation and random cropping may occur, the watermark should have strong robustness to protect information from being lost, and therefore the ultimate purpose of traceability and protection is achieved. In the embodiment of the present disclosure, the post-processing attacks are simulated in a training process, such that the encoder-decoder is more adaptive to an attack pattern. Specifically, after the module is disposed on the up-sampling generator, the post-processing attacks with different intensities are added to the composite image $x_c$, which aims to train robust decoder parameters. In the training process, the generator parameters are fixed to ensure that the generation process of the composite image is not affected. The image $x_c'$ is fed into the watermark decoder after being attacked, and finally a high-quality reconstructed watermark is obtained. The solution shows significant robustness against the post-processing attacks, and information storage is maintained in a reasonable and identifiable range.

VIII. An image and watermark joint generation evaluation system, a set of specific evaluation indicators is provided to evaluate the image quality, watermark invisibility, watermark reconstruction quality, watermark robustness and the like.

The embodiment of the present disclosure provides a set of evaluation modules suitable for image and watermark joint generation. The modules are configured to evaluate the image quality (namely IS (inception score) and FID (frechet inception distance)), watermark invisibility (namely PSNR (peak signal-to-noise ratio), SSIM (structural similarity index measure) and LPIPS (learned perceptual image patch similarity), watermark reconstruction quality (namely NC and CA), watermark robustness (namely NC and CA) and the like. As a supplementation for existing watermark space evaluation indicators NC, the embodiment of the present disclosure designs an indicator for measuring the character accuracy (CA) of the reconstructed watermark. The indicator is calculated by optical character recognition (OCR) and edit distance. Through calculation of the indicators of NC and CA, after simulation of post-processing attacks (such as rotation, cropping, Gaussian noise and impulse noise), it is proved that character data in the reconstructed watermark in the solution provided by the embodiment of the present disclosure may still be maintained and restored.

Embodiment 2

Figure 3:
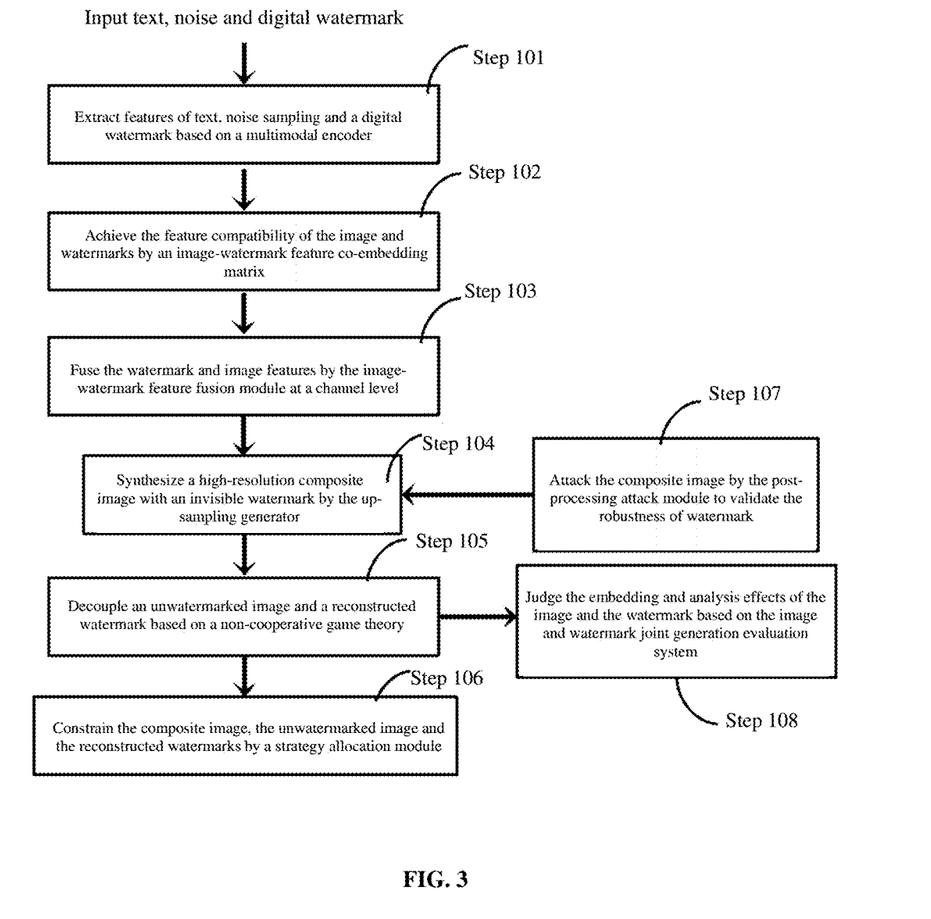
FIG. 3 is a flow chart of a cross-modal image-watermark joint generation and detection method.

The embodiment of the present disclosure provides a cross-modal image-watermark joint generation and detection method, and as shown in FIG. 3, the method includes the following steps:

Step 101: features of text, noise sampling and a digital watermark are extracted based on a multimodal encoder;

specifically, input text is sequentially coded by a BiLSTM model, noise sampling is encoded by MLP, digital watermark features are extracted by multilayer CNNs, and finally encoding features of three modal data are output; and furthermore, the noise feature and the text feature are calculated by affine transformation to obtain an initialized image feature.

Step 102: Feature compatibility of the image and the watermark is achieved by an image-watermark feature co-embedding matrix;

specifically, two learnable parameter matrices are set, by which an image and watermark co-embedding space is found; and on the basis of achieving feature alignment, channel-level tandem connection is conducted to achieve the feature compatibility of the image and the watermark.

Step 103: The watermark and image features are fused by the image-watermark feature fusion module at a channel level;

specifically, Unet serves as a fusion network of the image and watermark features. In order to ensure the visual effect of the final generated image, the image feature is integrated for many times to reduce watermark interference to fusion features, and the compatibility of watermark signals and image semantics can be ensured; and the visual effect of the final composite image is ensured.

Step 104: A high-resolution composite image with an invisible watermark is synthesized by the up-sampling generator;

specifically, the watermark and image fusion features are fed into the generator consisting of the up-sampling module to achieve generation of the high-quality composite image with a resolution of 256×256, in which watermark signals are hidden.

Step 105: An unwatermarked image and a reconstructed watermark are decoupled based on a non-cooperative game theory;

specifically, the watermark reconstruction and image decoding are regarded as a non-cooperative game process, aiming to independently develop two sets of allocation strategies for decoupling from the composite image. In the embodiment of the present disclosure, the allocation of the watermark feature and the image feature is required to achieve a Nash equilibrium state in order to ensure the decoupling quality thereof.

Step 106: The composite image, the unwatermarked image and the reconstructed watermark are constrained by a strategy allocation module;

specifically, the authenticity and consistency of the composite image are identified by the image discriminator, and information distribution strategy are allocated to the reconstructed watermark and unwatermarked image, so as to ensure the output quality of the composite image, the unwatermarked image and the reconstructed watermark.

Step 107: The composite image is attacked by the post-processing attack module to evaluate the robustness of the watermark;

specifically, common post-processing attacks with multiple intensities are added to the composite image, and watermark decoupling is conducted under the condition that pixel spatial information and semantic information are destroyed, to obtain robust decoder parameters, such that the watermark has strong robustness.

Step 108: The embedding and analysis effects of the image and the watermark are judged based on the image and watermark joint generation evaluation system.

Specifically, a set of comprehensive evaluation systems is applied to quantify the image and watermark joint generation effects, that is, measurement is conducted in terms of image quality (namely IS and FID), watermark invisibility (namely PSNR, SSIM and LPIPS), watermark reconstruction quality (namely NC and CA), watermark robustness (namely NC and CA) and the like. The embodiment of the present disclosure achieves excellent performance indicators.

To sum up, the digital watermark is embedded into a text-to-image process in the embodiment of the present disclosure, and influence on the visual effect of the generated image is reduced under the condition of the invisible watermark as far as possible; supervisory and traceability means are provided for visual generative artificial intelligence; and the security and reliability of the generated image are guaranteed. In the embodiment of the present disclosure, the information distribution strategy of the composite image can be developed by the non-cooperative game and Shannon information theory to achieve decoupling of the watermark and the image under quality trade-off. In the embodiment of the present disclosure, under the condition that the post-processing attacks are applied to the composite image, the watermark with a higher recognition degree Can still be reconstructed, which proves that the watermark technology provided by the embodiment of the present disclosure has robustness. The embodiment of the present disclosure is applicable for a method based on generative adversarial networks, and ensures that the generated image has the hidden watermark. The present disclosure has strong generalization. The embodiment of the present disclosure provides a set of evaluation systems combining text-to-image generation and the watermarking, which can evaluate the image quality, watermark invisibility, watermark reconstruction degree and watermark robustness. The above-mentioned technology provides a reliable technical support for the supervision and traceability of the generated image.

Embodiment 3

The solutions in Embodiments 1 and 2 are validated for feasibility below in combination with specific calculating examples and experimental data, and the detailed description is given as follows:

Table 1 to Table 3 are quantifiable results of an image and watermark joint generation device and method for visually generated content security. In the embodiment of the present disclosure, text-to-image models are selected from two paradigms of single-stage generation and multistage generation respectively, namely RAT-GAN (recurrent affine transformation-generative adversarial network) and AttnGAN (attentional generative adversarial network), to validate the generalization of the image and watermark joint generation provided.

Table 1 listed three images for fidelity comparison: (1) an original image: synthesized by a baseline model; (2) a composite image: refers to an image with a hidden watermark acquired from the generator of the present disclosure; (3) an analytic image: is an unwatermarked image version decoupled from the composite image. In the embodiment of the present disclosure, IS and FID indicators are used for evaluating the fidelity of the image. Ideally, although minor pixel-level interference exists, the composite image, the unwatermarked image and the original image should show almost the same visual appearance, and also have slight performance fluctuation in quantitative indicators.

TABLE 1

| Model | Image type | CUB-Birds IS↑ | CUB-Birds FID↓ | Oxford-102 Flowers IS↑ | Oxford-102 Flowers FID↓ | MS-COCO FID↓ |
|---|---|---|---|---|---|---|
| RAT-GAN | Original image | 5.36 ± 0.20 | 13.91 | 4.09 ± 0.06 | 16.04 | 14.60 |
| | Composite image | 4.94 ± 0.06 | 16.95 | 3.72 ± 0.07 | 18.35 | 15.62 |
| | Unwatermarked image | 4.98 ± 0.06 | 17.32 | 3.81 ± 0.07 | 19.16 | 15.28 |
| AttnGAN | Original image | 4.36 ± 0.03 | 23.98 | — | — | 35.49 |
| | Composite image | 4.02 ± 0.05 | 26.49 | — | — | 37.51 |
| | Unwatermarked image | 4.09 ± 0.05 | 26.01 | — | — | 38.29 |

The invisibility of the hidden watermarks should be embodied such that when the watermarks reach the Nash equilibrium state, they are imperceptible to a human visual system, and the composite image should not leak information obviously. The similarity between the composite image and the analytic image is measured by PSNR. As shown in Table 2, on a CUB-Birds dataset, PSNR values of RAT-GAN and AttnGAN are 33.29 dB and 33.86 dB respectively, while on Oxford-102 Flowers and MS-COCO datasets, an equivalent PSNR is obtained. When the PSNR is 30 dB, an embedded signal may be regarded as having high invisibility, and the embodiment of the present disclosure exceeds the threshold obviously. Therefore, the PSNR verifies the height invisibility of various watermarks in the embodiment of the present disclosure. Human perceptual preferences are simulated from three perspectives, and further evaluation is conducted by SSIM; the SSIM of two models maintains a matching rate of more than 99%, which proves the compatibility of the hidden watermark and a restored image and the invisibility of the watermark. Finally, in order to focus on the intrinsic structure of the image feature, the LPIPS model is used for learning the perceived distance of the composite image and the unwatermarked image. The model is evaluated by depth features. The RAT-GAN and the AttnGAN reach 0.0219 and 0.0235 on MS-COCO, which are less than 0.0320 reached under the condition that the real image is processed by an existing watermark embedding method. This indicates that a secret watermark hidden in the composite image is almost imperceptible. Therefore, almost traceless watermark information hiding is achieved in the embodiment of the present disclosure.

TABLE 2

| Model | CUB-Birds PSNR(dB)↑ | CUB-Birds SSIM(%) | CUB-Birds LPIPS↑ | Oxford-102 Flowers PSNR(dB)↑ | Oxford-102 Flowers SSIM(%) | Oxford-102 Flowers LPIPS↓ | MS-COCO PSNR(dB)↑ | MS-COCO SSIM(%) | MS-COCO LPIPS↓ |
|---|---|---|---|---|---|---|---|---|---|
| RAT-GAN | 33.29 | 98.46 | 0.0257 | 33.51 | 98.60 | 0.0231 | 33.97 | 98.77 | 0.0219 |
| AttnGAN | 33.86 | 98.15 | 0.0223 | — | — | — | 33.54 | 98.26 | 0.0235 |

Table 3 listed the degree of watermark reconstruction evaluated from the perspective of space and characters in the absence of attacks. The spatial similarity is measured by NC in a pixel-by-pixel manner, and this indicates that there are fewer distorted pixels. The similarity between the reconstructed watermark and the hidden watermark exceeds 99%. Therefore, the embodiment of the present disclosure achieves extremely high level of reconstruction from the spatial perspective. The embodiment of the present disclosure then provides a CA (Character Accuracy) indicator, by which the character accuracy is measured semantically in combination with OCR and an edit distance. It can be observed that an average CA is less than 0.17, which shows that almost all characters are recognizable in the absence of attacks.

TABLE 3

| Model | CUB-Birds NC(%)↑ | CUB-Birds CA↓ | Oxford-102 Flowers NC(%)↑ | Oxford-102 Flowers CA↓ | MS-COCO NC(%)↑ | MS-COCO CA↓ |
|---|---|---|---|---|---|---|
| RAT-GAN | 99.75 | 0.21 | 99.69 | 0.19 | 99.81 | 0.19 |
| AttnGAN | 99.72 | 0.23 | — | — | 99.48 | 0.21 |

Figure 4:
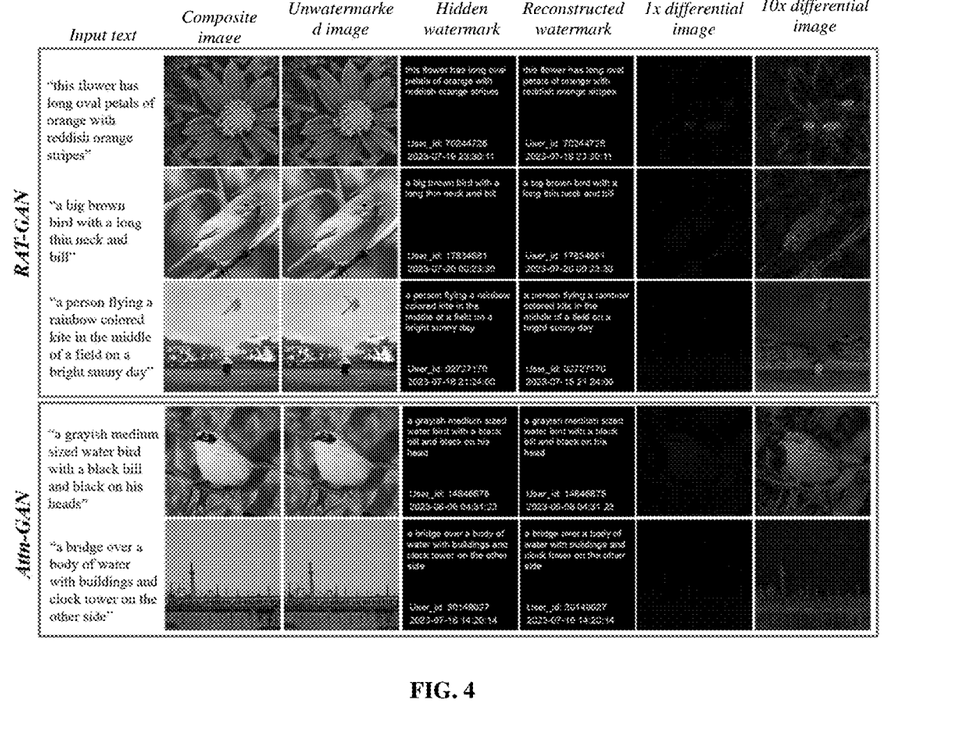
FIG. 4 is a case exhibition diagram of the generated images.

FIG. 4 is a case exhibition diagram of a generated image, which shows five sets of examples, and each example includes a composite image, an unwatermarked image, a hidden watermark, a reconstructed watermark, and single-fold and tenfold image differences. The presence of the hidden watermark in the image does not significantly change the visual appearance of the pattern, and it shows subtle changes in chroma under the condition of no information leakage. In addition, the watermark achieves almost lossless reconstruction, and all characters are clearly visible. The embodiment of the present disclosure achieves a significant visual effect, and ensures information distribution trade-off between the image and the watermark.

Figure 5:
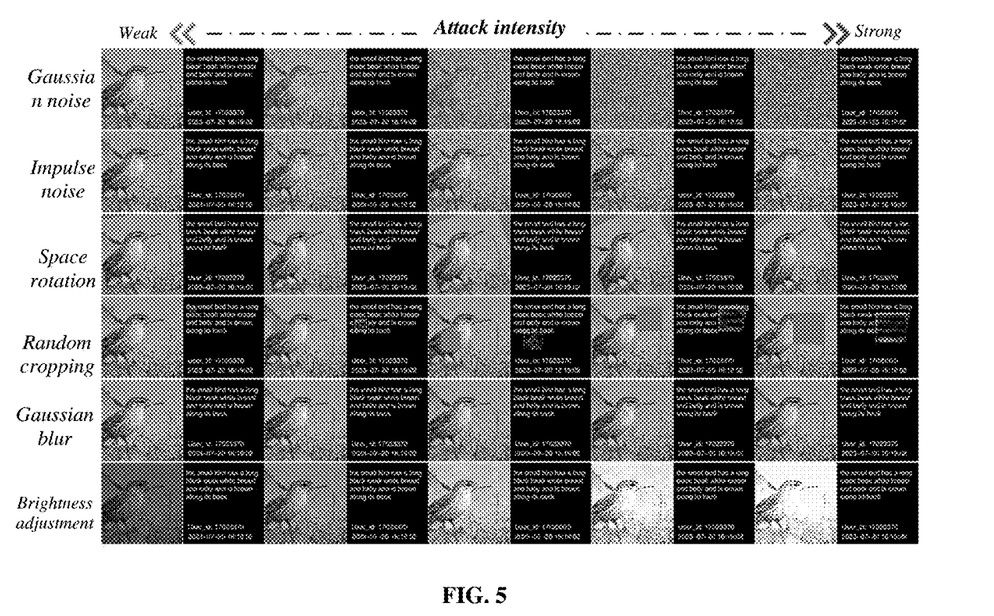
FIG. 5 is a case exhibition diagram of the watermarks under multiple post-process attacks.
Figure 6:
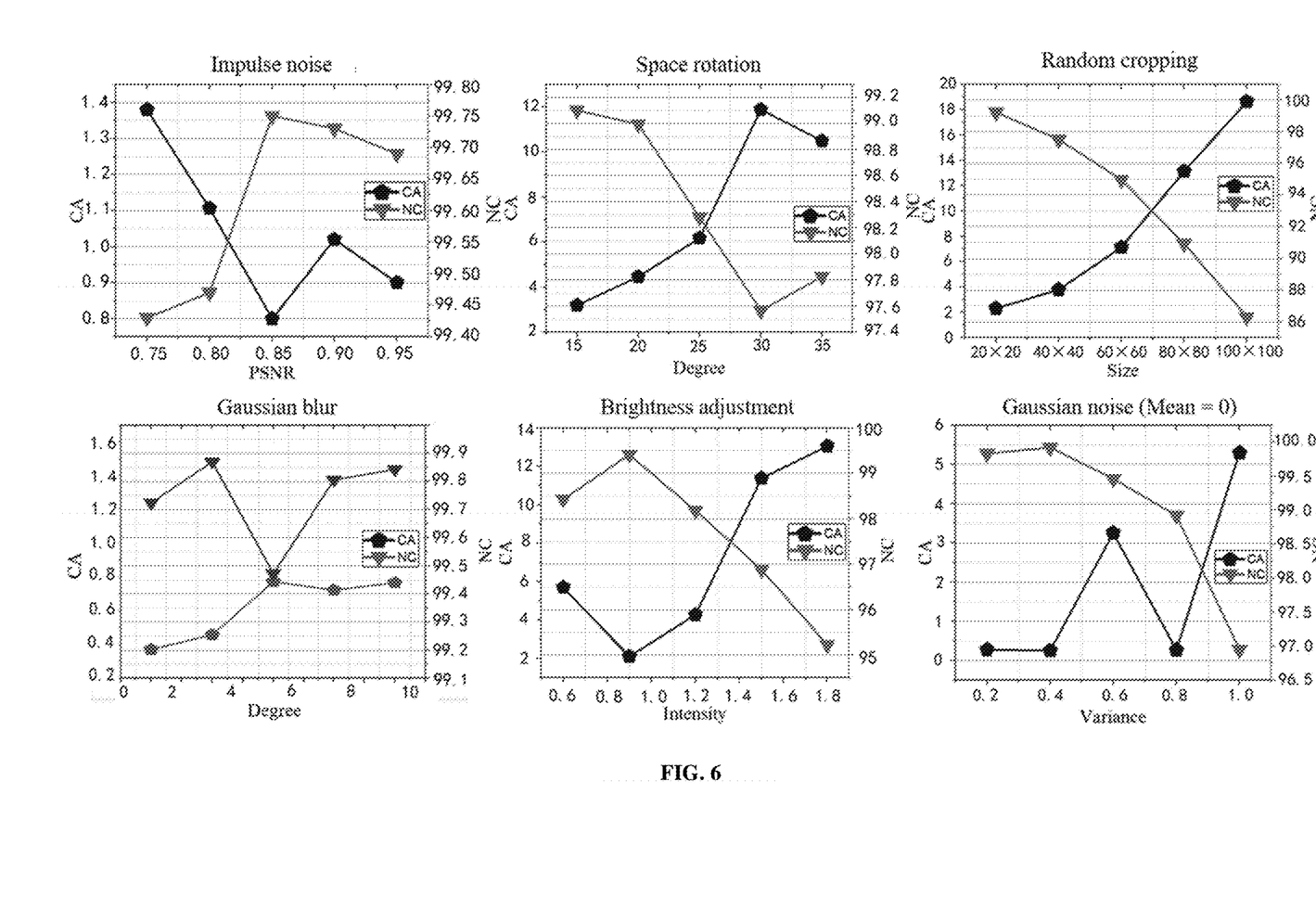
FIG. 6 is a contrast effect diagram of performance quantification of watermark reconstruction under multiple post-process attacks.

FIG. 5 is a case exhibition diagram of a watermark analysis effect under multiple post-process attacks; FIG. 6 shows performance quantification of watermark analysis under multiple post-process attacks, and exhibits that the embodiment of the present disclosure has significant robustness against common post-processing attacks and higher watermark reconstruction capability. Generally, the watermark obtained after attacks ensures a certain character recognizability, which is enough to support traceability. Therefore, the embodiment of the present disclosure can guarantee the reconstruction quality of the watermark under attacks, and ensure the excellent robustness thereof under post-processing attacks with various intensities.

To sum up, the embodiment of the present disclosure proves the characteristics of high quality of the generated image, high invisibility of the embedded watermark, high reconstruction accuracy of the watermark, strong robustness of the watermark against post-processing attacks and the like by a set of comprehensive evaluation systems, and the technical requirements of text-to-image and watermark joint generation can be met fully. The embodiment of the present disclosure aims to enable supervision of the visual generative model, support traceability of the generated image, and guarantee the security and reliability of the generated visual content.

Embodiment 4

An image-watermark joint generation and detection device includes a processor and a memory, wherein program instructions are stored in the memory, and the processor calls the program instructions stored in the memory to enable the device to implement the following steps of a method:
achieving a feature compatibility of an image and a watermark by an image-watermark feature co-embedding matrix; fusing features of the watermark and the image by image-watermark feature fusion at a channel level;
synthesizing a high-resolution composite image with an invisible watermark by an up-sampling generator; decoupling an unwatermarked image and a reconstructed watermark based on a non-cooperative game theory;
constraining the composite image, the unwatermarked image and the reconstructed watermark by strategy allocation; attacking the composite image by post-processing attacks; and judging embedding and analysis effects of the image and the watermark.

It should be noted here that the description of the device in the above embodiment corresponds to that of the method in the embodiment, which is not repeated in the embodiment of the present disclosure.

An executive body of the processor and the memory may be a computer, a single-chip microcomputer, a microcontroller and other devices with calculating functions. The executive body is not limited to the embodiment of the present disclosure during specific implementation, which is selected according to requirements in actual application.

Data signals are transmitted between the memory and the processor through a bus, which is not repeated in the embodiment of the present disclosure.

Based on the same inventive concept, an embodiment of the present disclosure further provides a computer-readable storage medium including a stored program, and when running, the program controls equipment where the storage medium is located to implement the steps of the method in the above embodiment.

The computer-readable storage medium includes but is not limited to a flash memory, a hard disk, a solid state disk and the like.

It should be noted here that the description of the readable storage medium in the above embodiment corresponds to that of the method in the embodiment, which is not repeated in the embodiment of the present disclosure.

In the above embodiment, the implementation may be implemented in whole or in part by software, hardware, firmware, or any combination thereof. When achieved by the software, it may be achieved in whole or in part in the form of a computer program product. The computer program product includes one or more computer instructions. When the computer program instructions are loaded and executed on a computer, flows or functions of the embodiment of the present disclosure are generated in whole or in part.

The computer may be a general-purpose computer, a special-purpose computer, a computer network or other programmable devices. The computer instructions may be stored in the computer-readable storage medium or transmitted through the computer-readable storage medium. The computer-readable storage medium may be any available medium capable of being accessed by the computer or data storage equipment such as a server and a data center integrated with one or more available media. The available medium may be a magnetic medium or a semiconductor medium or else.

The embodiments of the present disclosure do not limit models of other devices except for those specifically stated, as long as the devices can complete the above functions.

Those skilled in the art can understand that the drawing is only a schematic diagram of a preferred embodiment. The serial numbers of the above embodiments of the present disclosure are merely for description, and do not represent the advantages and disadvantages of the embodiments.

The above descriptions are merely preferred embodiments of the present disclosure, which are not intended to limit the present disclosure. Any modification, equivalent replacement and improvement made within the spirit and principle of the present disclosure should fall within the protection scope of the present disclosure.

What is claimed is:

1. A cross-modal image-watermark joint generation and detection device, comprising:
an image-watermark feature co-embedding module, configured to map an original image feature and a watermark feature to a unified feature space by a learnable parameter matrix;
an image-watermark feature fusion module, configured to fuse the watermark feature and the original image feature at a channel level to acquire an image-watermark fusion feature and cascade the original image feature for a plurality of times;
an up-sampling generator, configured to map the image-watermark fusion feature into pixels to acquire a composite image with a preset resolution;
a non-cooperative game decoupling module, configured to allocate information of the composite image through two decoders by developing allocation strategies according to a non-cooperative game theory and a Shannon information theory to decouple an unwatermarked image and a reconstructed watermark;

a strategy allocation module, configured to set an image joint discriminator, extract features of the composite image by multi-specification down-sampling convolution kernels to constrain image-text semantic consistency and fidelity, and set an objective function to constrain reconstruction of watermark and unwatermarked image; and a post-processing attack module, configured to simulate post-processing attacks and output a final image-watermark joint generated image;

wherein, the original image feature is obtained by a multimodal encoder, the multimodal encoder configured to extract features from an input text, noise sampling and a digital watermark by pre-trained natural language encoding models, multilayer perceptrons, and visual encoding models, and acquire feature representations thereof to obtain the original image feature through affine transformation using text features and noise features.

2. The cross-modal image-watermark joint generation and detection device according to claim 1, wherein the device further comprises an image and watermark joint generation evaluation module, configured to evaluate image quality, watermark invisibility, watermark reconstruction quality and watermark robustness.

3. The cross-modal image-watermark joint generation and detection device according to claim 1, wherein the image-watermark feature co-embedding module is as follows:

$$f_{t,w} = \phi_c(T_t M_t, T_w M_w)$$

where, $f_{t,w}$ is an image and watermark splicing feature, $\phi_c(\cdot)$ represents a channel-level splicing operation, $M_t$ represents the original image feature and $M_w$ represents the watermark feature, $T_t$ and $T_w$ are learnable corresponding dimension parameter matrices.

4. The cross-modal image-watermark joint generation and detection device according to claim 3, wherein the image-watermark feature fusion module is as follows:

$$M_i^c = \begin{cases} E_{Unet}(f_{t,w}), & i = 1 \\ Y_i(M_{i-1}^c, M_t; \theta_i), & i = 2, 3, \ldots, N \end{cases}$$

where, $Y_i(\cdot)$ is an ith-layer feature fusion module, which consists of a full connected network (FCN) with a parameter of $\theta_i$ and a nearest neighbor interpolation algorithm; $M_i^c$ is a composite visual feature map output from an ith layer, and $E_{Unet}(\cdot)$ is a Unet-based encoder, configured to couple a visual feature to a watermark feature.

5. The cross-modal image-watermark joint generation and detection device according to claim 3, wherein the non-cooperative game decoupling module comprises an image decoding unit and a watermark reconstruction unit, the image decoding unit being expressed as:

$$\operatorname*{argmax}_{s_{x_r}} M_{gain}^{P_{x_r}}(s_{x_r})$$

$$= \operatorname*{argmin}_{\theta_x} L_{x_c \to x_r}(\theta_x)$$

$$= \operatorname*{argmin}_{\theta_x} \Delta MI(w_h, x_r; \theta_x) - \Delta MI(x_c, x_r; \theta_x)$$

s.t., $\Delta MI(x_c, x_r) \leq I(x_c) - I(w_r)$ where, $\Delta MI(\cdot)$ represents a mutual information function calculated by Kullback-Leibler divergence and used for optimizing a parameter $\theta_x$, $s_{x_r}$ represents an unwatermarked image decoupling strategy, $M_{gain}^{P_{xr}}(\cdot)$ represents a gain from an execution of the unwatermarked image decoupling strategy, $I(x_c)$ represents an information quantity of $x_c$, $I(w_r)$ represents an information quantity of $w_r$, $w_h$ represents a hidden watermark; and a target $L_{x_c \to x_r}(\theta_x)$ aims to restore an unwatermarked image $x_r$; $x_c$ represents the composite image with a resolution of 256×256;

the watermark reconstruction unit being expressed as:

$$\operatorname*{argmax}_{s_{w_r}} M_{gain}^{P_{w_r}}(s_{x_r})$$

$$= \operatorname*{argmin}_{\theta_w} L_{x_c \to w_r}(\theta_w)$$

$$= \operatorname*{argmin}_{\theta_w} \{[I(x_c; \theta_w) - \Delta MI(x_c, x_r; \theta_w)] - I(w_r; \theta_w)\}$$

s.t., $I(w_r) < I(x_c)$ where, $s_{w_r}$ represents a watermark reconstruction strategy, and $M_{gain}^{P_{wr}}(\cdot)$ represents a gain from an execution of the watermark reconstruction strategy; $\theta_w$ represents network parameter; a target $L_{x_c \to x_r}(\theta_x)$ compels $w_r$ to keep away from the space $x_r$ and approach to the space $x_c$.

6. A cross-modal image-watermark joint generation and detection method, comprising:

mapping an original image feature and a watermark feature to a unified feature space by a learnable parameter matrix;

fusing the watermark feature and the original image feature at a channel level to acquire an image-watermark fusion feature and cascading the original image feature for a plurality of times;

mapping the image-watermark fusion feature into pixels to acquire a composite image with a preset resolution;

allocating information of the composite image through two decoders by developing allocation strategies according to a non-cooperative game theory and a Shannon information theory to decouple an unwatermarked image and a reconstructed watermark;

setting an image joint discriminator, extracting features of the composite image by multi-specification down-sampling convolution kernels to constrain image-text semantic consistency and fidelity, and setting an objective function to constrain reconstruction of watermark and unwatermarked image; and simulating post-processing attacks and outputting a final image-watermark joint generated image;

wherein, the original image feature is obtained by a multimodal encoder, the multimodal encoder configured to extract features from an input text, noise sampling and a digital watermark by pre-trained natural language encoding models, multilayer perceptrons, and visual encoding models, and acquire feature representations thereof to obtain the original image feature through affine transformation using text features and noise features.

7. A non-transitory computer-readable storage medium, wherein a computer program is stored on the computer-readable storage medium, and the computer program comprises program instructions; and when the program instructions are executed by the processor, the method according to claim 6 is implemented by the processor.

* * * * *